United States Patent
Yang

(10) Patent No.: US 12,270,465 B2
(45) Date of Patent: Apr. 8, 2025

(54) DISCONNECTOR APPARATUS

(71) Applicant: Hyundai Transys Inc., Seosan-si (KR)

(72) Inventor: Se Dong Yang, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/649,191

(22) Filed: Apr. 29, 2024

(65) Prior Publication Data

US 2024/0384783 A1 Nov. 21, 2024

(30) Foreign Application Priority Data

May 15, 2023 (KR) ........................ 10-2023-0062411

(51) Int. Cl.
  *F16H 48/08* (2006.01)
  *F16H 48/24* (2006.01)
  *F16H 48/34* (2012.01)
(52) U.S. Cl.
  CPC ............ *F16H 48/08* (2013.01); *F16H 48/24* (2013.01); *F16H 2048/343* (2013.01)
(58) Field of Classification Search
  CPC .................................... F16H 48/08–2048/343
  See application file for complete search history.

(56) References Cited

U.S. PATENT DOCUMENTS

| | | | | |
|---|---|---|---|---|
| 5,890,989 A | * | 4/1999 | Yamazaki | B60K 23/08 |
| | | | | 192/69.82 |
| 7,294,085 B2 | * | 11/2007 | Pistagnesi | F16H 48/24 |
| | | | | 475/231 |
| 8,851,212 B2 | * | 10/2014 | Kahl | B60K 17/36 |
| | | | | 475/221 |
| 9,784,355 B1 | * | 10/2017 | Brammer | B60K 23/08 |
| 11,098,794 B2 | * | 8/2021 | Yudell | F16H 48/32 |

FOREIGN PATENT DOCUMENTS

| CN | 115325129 A | * | 11/2022 | ............ F16H 48/08 |
|---|---|---|---|---|
| CN | 116480751 A | * | 7/2023 | |
| DE | 102018007237 A1 | * | 4/2019 | |
| JP | 2588918 B2 | | 3/1997 | |
| JP | H10148250 A | | 6/1998 | |
| JP | 2005083407 A | | 3/2005 | |
| KR | 101530485 B1 | * | 6/2015 | |
| KR | 10-2017-0123869 A | | 11/2017 | |
| KR | 10-2251325 B1 | | 5/2021 | |

* cited by examiner

*Primary Examiner* — Ernesto A Suarez
*Assistant Examiner* — James J Taylor, II
(74) *Attorney, Agent, or Firm* — Bridgeway IP Law Group, PLLC; Jihun Kim

(57) ABSTRACT

Proposed is a disconnector apparatus including a casing having therein a support ring and one side gear, and a clutch ring having a first clutch part disposed on an inner-diameter portion of the clutch ring at one side of the clutch ring facing one side gear, and a second clutch part disposed on one inner surface of the inner-diameter portion, in which the first clutch part engages with a third clutch part disposed on an outer-diameter portion of the support ring at one side of the support ring, and the second clutch part engages with a fourth clutch part disposed on one surface of the one side gear.

10 Claims, 3 Drawing Sheets

DISCONNECTOR APPARATUS

CROSS-REFERENCE TO RELATED APPLICATIONS

This application claims priority to and the benefit of Korean Patent Application No. 10-2023-0062411 filed in the Korean Intellectual Property Office on May 15, 2023, the entire contents of which are incorporated herein by reference.

TECHNICAL FIELD

The present invention relates to a disconnector apparatus capable of switching power to four-wheel drive or two-wheel drive.

BACKGROUND ART

In general, a disconnector apparatus refers to an apparatus mounted in a differential assembly and capable of minimizing an unnecessary loss of power by switching between two-wheel drive (2WD) and four-wheel drive (4WD) by engaging or disengaging a differential shaft depending on a traveling situation.

The disconnector apparatus in the related art includes a differential assembly, a disconnector shaft connected to a right differential side gear provided in a differential casing, a disconnector hub connected to a right vehicle wheel, and a disconnector sleeve configured to allow or block the transmission of power between the disconnector shaft and the disconnector hub. When the disconnector sleeve simultaneously engages with a dog gear part of the disconnector shaft and a dog gear part of the disconnector hub, an input part such as a motor or engine and an output part such as a vehicle wheel are dynamically connected to each other, such that four-wheel drive (4WD) may be implemented. When the disconnector sleeve moves toward the disconnector hub and the dog gear part of the disconnector shaft and the dog gear part of the disconnector hub disengage from each other, the transmission of power between the input part such as the motor or engine and the output part such as the vehicle wheel is blocked, such that two-wheel drive (2WD) may be implemented.

However, in the disconnector apparatus in the related art, the overall length and space of the vehicle excessively increase because of the complicated operational structure in which the ball screw shaft, the fork, and the disconnector sleeve are operated in conjunction with one another by the operation of the motor, and the disconnector shaft and the disconnector hub are connected by an operation of the disconnector sleeve, which causes disadvantages in respect to the weight and mountability of the vehicle. Further, in the case of two-wheel drive implemented by disconnecting an auxiliary driving wheel of a four-wheel drive vehicle, the final gear is stopped as the rotation of the input part is stopped, and a high differential occurs, in which the differential pinion gear is rotated at high speed by the rotation of the left differential side gear when the vehicle travels straight at high speed in the state in which the disconnector shaft and the disconnector hub are disconnected. For this reason, noise and vibration occur.

DOCUMENT OF RELATED ART

Patent Document (Patent Document 1) Korean Patent Application Laid-Open No. 10-2017-0123869 (published on Nov. 9, 2017)

SUMMARY OF THE INVENTION

The present invention has been made in an effort to solve the above-mentioned problem, and an object of the present invention is to provide a disconnector apparatus, in which a first clutch part provided in a clutch ring and a third clutch part of a support ring may engage with each other to implement four-wheel drive, or a second clutch part of the clutch ring and a fourth clutch part of one side gear engage with each other to restrict a differential in the state in which the first clutch part and the third clutch part engage with each other.

In order to achieve the above-mentioned object, the present invention provides a disconnector apparatus including: a casing having therein a support ring and one side gear, one side gear engaging with a pinion gear in the support ring; and a clutch ring connected to an actuator device by a sleeve and configured to be movable by an operation of the actuator device, the clutch ring including a first clutch part provided on one side inner-diameter portion directed toward one side gear, and a second clutch part provided on one inner surface of the inner-diameter portion, in which the first clutch part engages with a third clutch part provided on one side outer-diameter portion of the support ring by a first moving operation of the clutch ring by a first operation of the actuator device, and in which the second clutch part engages with a fourth clutch part provided on one surface of one side gear by a second moving operation of the clutch ring by a second operation of the actuator device.

In addition, the first clutch part and the third clutch part may each be configured as a spline clutch.

In addition, the second clutch part and the fourth clutch part may each be configured as a dog clutch.

In addition, the clutch ring may have a plurality of leg parts, the leg part may extend toward a sleeve from the other side of the clutch ring, and an end of the leg part may be exposed to the outside through a through-hole of the casing and connected to the sleeve.

In addition, the sleeve may be connected to a fork, and the fork may be provided on a transfer nut of the actuator device.

In addition, during the first operation of the actuator device, the sleeve may push the clutch ring to allow the first clutch part to engage with the third clutch part to implement four-wheel drive, and during the second operation of the actuator device, the sleeve may further push the clutch ring to allow the second clutch part to engage with the fourth clutch part to restrict a differential.

In addition, a contact surface of the leg part, which comes into contact with the through-hole, may have an inversely tapered structure in which a width thereof decreases in a direction from the end of the leg part toward the through-hole.

In addition, the actuator device may include: a housing; a motor coupled to the housing; and a ball screw shaft connected to the motor, the transfer nut may be coupled to the ball screw shaft and configured to be movable along the ball screw shaft while being guided by a guide rail mounted in the housing, and the fork may extend in a direction from the transfer nut toward the sleeve through an opening portion of the housing and be connected to the sleeve.

In addition, one side of the guide rail may be elastically supported by a return spring, one side of the return spring may be inserted into an accommodation hole of the housing, and the other side of the return spring may be assembled to be caught by a catching projection provided at one side of the guide rail.

In addition, the pinion gear may engage with the other side gear opposite to one side gear.

In addition, a coupling pin may be coupled to the outer-diameter portion of the support ring and penetrate a center of the pinion gear.

In addition, a fixing pin may be coupled to one side of the support ring and penetrate the coupling pin.

According to the present invention, the first clutch part provided in the clutch ring and the third clutch part of the support ring may engage with each other to implement the four-wheel drive, or the second clutch part of the clutch ring and the fourth clutch part of one side gear engage with each other to restrict the differential in the state in which the first clutch part and the third clutch part engage with each other.

In addition, according to the present invention, when the disconnector system is disengaged and the auxiliary driving wheels coast in the two-wheel drive mode of the vehicle, the support ring, which supports the differential gear set including the two side gears and the four pinion gears, rotates, which makes it possible to solve the problem of noise caused by a high differential in the related art.

In addition, according to the present invention, the current is applied to the motor only when the clutch ring is coupled, which makes it possible to minimize the current consumption.

In addition, according to the present invention, the actuator device is modularized, which makes it possible to ensure assembly properties, facilitate repair, and reduce a defect rate.

In addition, the present invention may significantly reduce the overall length, thereby reducing the weight and greatly improving the packaging mountability.

In addition, the present invention may eliminate a component such as a disconnector shaft in the related art and reduce the number of components by modularizing the actuator device, which provides advantages in respect to spatial characteristics, weight, and costs.

In addition, the present invention may simplify the assembling process by modularizing the actuator device.

In addition, according to the present invention, because the actuator device is modularized, the actuator device may be mounted in any speed reducer as long as the space for mounting the clutch ring and the support ring is ensured, which makes it possible to reduce the development period and provide high versatility.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
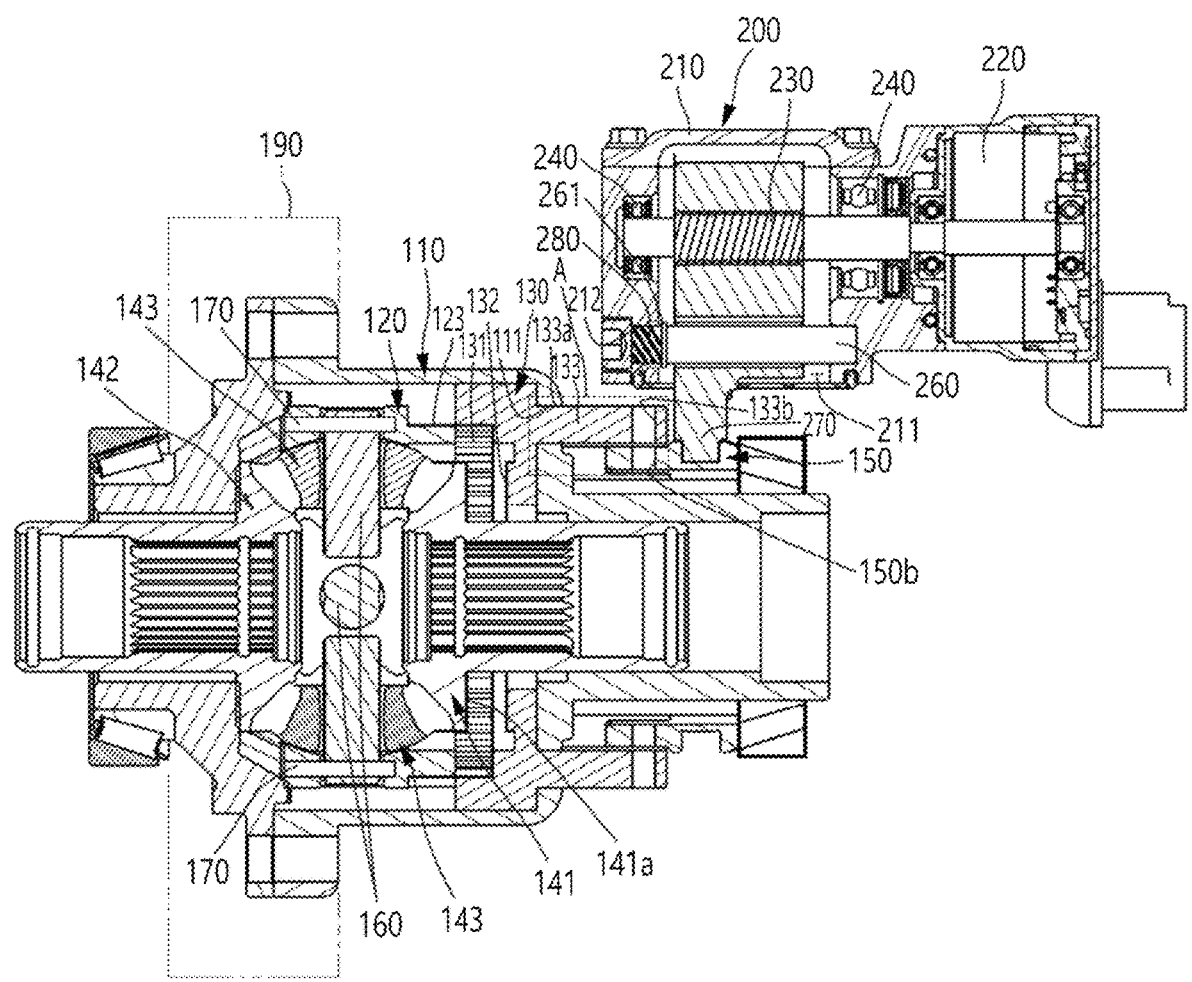
FIG. 1 is a view illustrating a disconnector apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

The present invention may be applied to electric vehicles (EV, battery electric vehicle), internal combustion engine (ICE) vehicles, hybrid electric vehicles (HEV), and the like.

Figure 2:
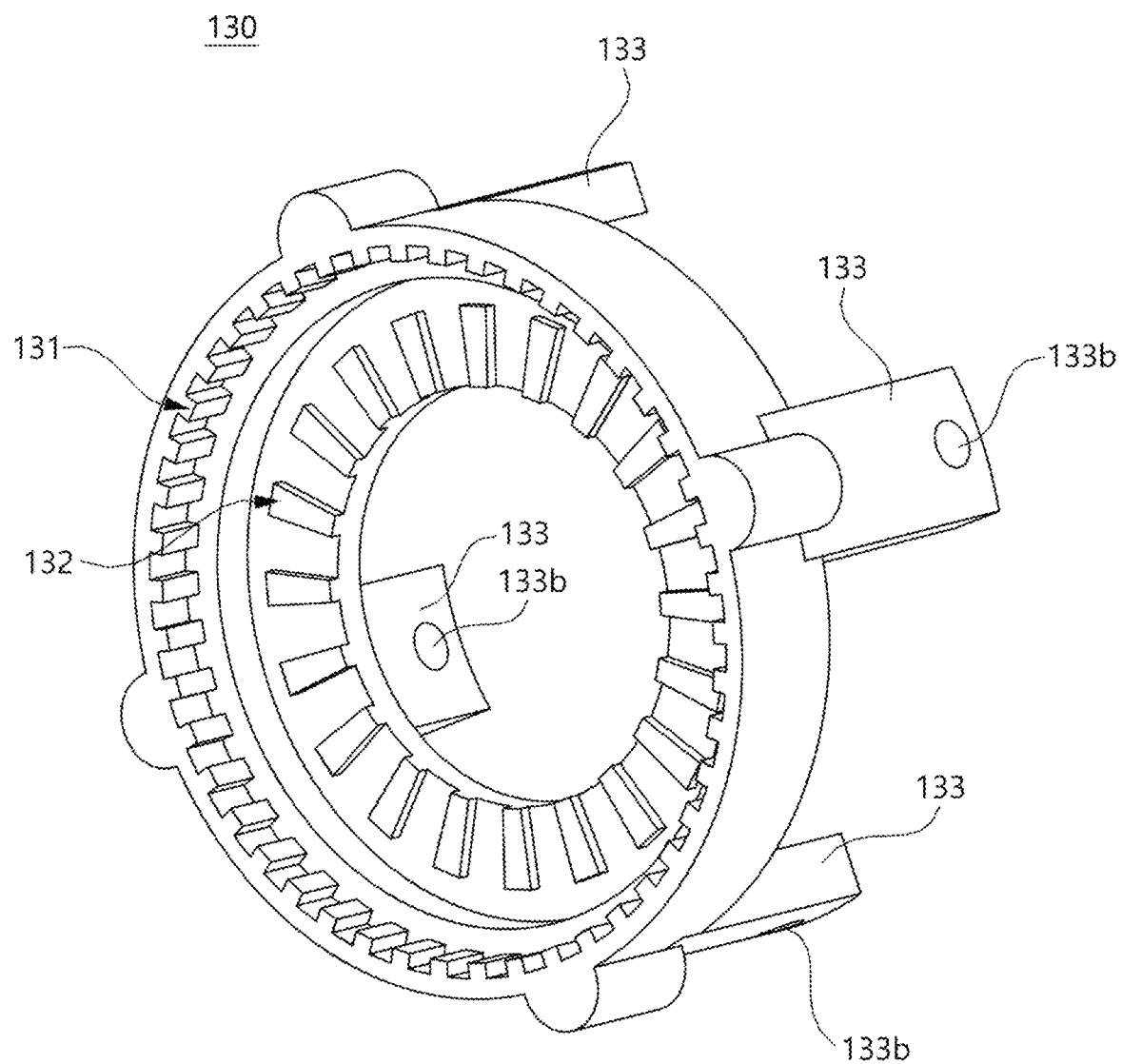
FIG. 2 is an enlarged view of a clutch ring according to the exemplary embodiment of the present invention.
Figure 3:
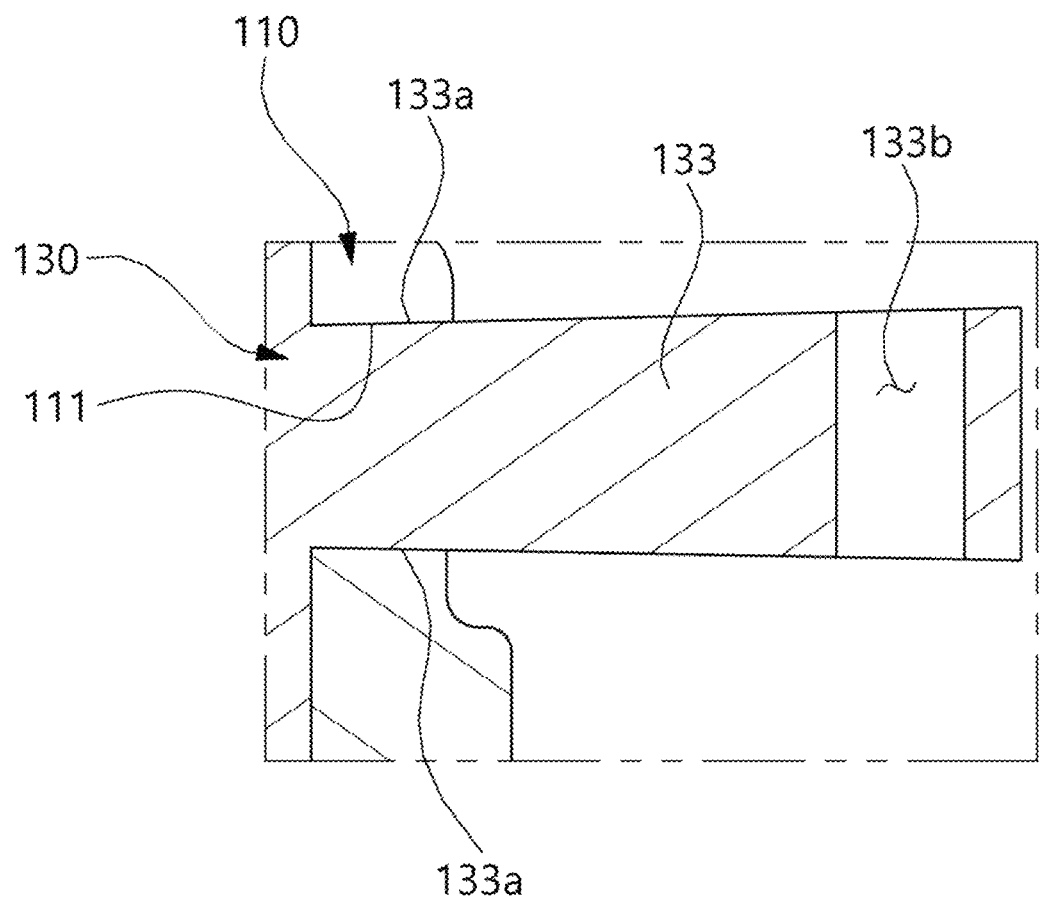
FIG. 3 is an enlarged view of part A in FIG. 1.

FIG. 1 is a view illustrating a disconnector apparatus according to an exemplary embodiment of the present invention, FIG. 2 is an enlarged view of a clutch ring according to the exemplary embodiment of the present invention, and FIG. 3 is an enlarged view of part A in FIG. 1.

As illustrated in FIGS. 1 to 3, the present invention includes a casing 110 and a clutch ring 130.

A support ring 120, a pinion gear 143, and one side gear 141 and the other side gear 142, which engage with the pinion gear 143, may be mounted in the casing 110.

A part of the clutch ring 130 may be coupled to an inner portion of the casing 110, and another part of the clutch ring 130 may be exposed to the outside of the casing 110.

A power transmission member 190, such as a final gear or a reduction gear, may be coupled to an outer portion of the casing 110. Power of a power generation device (not illustrated), such as an engine or a drive motor, may be transmitted to the power transmission member 190. The power transmitted to the power transmission member 190 may be transmitted to the casing 110.

The clutch ring 130 includes a first clutch part 131 and a second clutch part 132. The first clutch part 131 may be provided on one side inner-diameter portion of the clutch ring 130. The second clutch part 132 may be provided on one inner surface of one side inner-diameter portion of the clutch ring 130. The second clutch part 132 may be configured radially.

The first clutch part 131 may engage with a third clutch part 123 provided on one side outer-diameter portion of the support ring 120. The second clutch part 132 may engage with a fourth clutch part 141a provided on one surface of one side gear 141.

For example, the first clutch part 131 and the third clutch part 123 may each be configured as a spline clutch. The second clutch part 132 and the fourth clutch part 141a may each be configured as a dog clutch.

The clutch ring 130 may have a plurality of leg parts 133. The leg part 133 may extend toward a sleeve 150 from the other side of the clutch ring 130. An end of the leg part 133 may be exposed to the outside through a through-hole 111 of the casing 110. The end of the leg part 133 may be connected to the sleeve 150.

For example, four leg parts 133 may be formed at equal intervals about the clutch ring 130 as a central axis.

The leg parts 133 and the sleeve 150 may be connected by bolting, welding, or the like. For example, bolt holes 133b and 150b may be formed in the leg part 133 and the sleeve 150, and bolts may be coupled to the bolt holes 133b and 150b.

The sleeve 150 may be connected to a fork 270. The fork 270 may be provided on a transfer nut 250 of an actuator device 200.

The sleeve 150 performs a first moving operation by a first operation of the actuator device 200 and pushes the clutch ring 130 toward one side gear 141 to allow the first clutch part 131 to be coupled to the third clutch part 123, such that four-wheel drive may be implemented.

The sleeve 150 performs a second moving operation by a second operation of the actuator device 200 and further pushes the clutch ring 130 toward one side gear 141 to allow the second clutch part 132 to be coupled to the fourth clutch part 141a, such that a differential is restricted.

A contact surface 133a of the leg part 133 of the clutch ring 130, which comes into contact with the through-hole 111 of the casing 110, may have an inversely tapered structure. Specifically, the leg part 133 of the clutch ring 130 may have an inversely tapered structure having a width that decreases in a direction from the end of the leg part 133 toward the through-hole 111 (see FIG. 3).

The actuator device 200 may include a housing 210, a motor 220, and a ball screw shaft 230. The motor 220 may be coupled to the housing 210. The ball screw shaft 230 may be connected to the motor 220 and configured to be rotated by an operation of the motor 220.

The ball screw shaft 230 may be rotatably in the housing 210 by means of a support member 240 such as a bearing.

The transfer nut 250 may be provided in the housing 210. The transfer nut 250 may be coupled to the ball screw shaft 230. When the ball screw shaft 230 rotates, the transfer nut 250 may move along the ball screw shaft 230 while being guided by a guide rail 260 mounted in the housing 210.

A return spring 280 may be coupled to one side of the guide rail 260. The return spring 280 may elastically support the guide rail 260.

One side of the return spring 280 may be inserted into an accommodation hole 212 of the housing 210. The other side of the return spring 280 may be assembled to be caught by a catching projection 261 provided at one side of the guide rail 260.

The fork 270 may extend in a direction from the transfer nut 250 toward the sleeve 150 through an opening portion 211 of the housing 210. The fork 270 may be connected to the sleeve 150.

The pinion gear 143 may be mounted in the support ring 120. The pinion gear 143 may engage with one side gear 141 and the other side gear 142 opposite to one side gear 141.

A coupling pin 160 may be coupled to the outer-diameter portion of the support ring 120 and penetrate a center of the pinion gear 143. A fixing pin 170 may be coupled at one side of the support ring 120 and penetrate the coupling pin 160.

Next, an operation in the case of four-wheel drive of the present invention will be described.

As illustrated in FIGS. 1 to 3, when the ball screw shaft 230 is rotated by the operation of the motor 220 of the actuator device 200, the transfer nut 250 may move in a coupling direction of the clutch ring 130.

When the transfer nut 250 moves in the coupling direction of the clutch ring 130, the fork 270 integrated with the transfer nut 250 may move the sleeve 150 in the coupling direction of the clutch ring 130.

Because the sleeve 150 pushes the clutch ring 130 toward the support ring 120 while performing the first moving operation by the first operation of the actuator device 200, the first clutch part 131 may engage with the third clutch part 123. Therefore, the four-wheel drive (4WD) may be implemented.

In the case of the four-wheel drive, the power of the power generation device (not illustrated), such as the engine or the drive motor, may be transmitted to the power transmission member 190.

The power of the power generation device may be transmitted to the casing 110 via the power transmission member 190. The support ring 120 may rotate as the casing 110 rotates. The support ring 120 may be coupled to the clutch ring 130 fixed to the casing 110 and rotate together with the casing 110 in the state in which the support ring 120 is connected to the casing 110.

When the support ring 120 rotates together with the casing 110, the power may be transmitted to one side gear 141 and the other side gear 142 that engage with the pinion gear 143, such that one side gear 141 and the other side gear 142 may rotate.

When one side gear 141 and the other side gear 142 rotate, the power may be transmitted to two opposite auxiliary driving wheels (not illustrated) connected to one side gear 141 and the other side gear 142, such that the two opposite auxiliary driving wheels may rotate. Therefore, the four-wheel drive may be implemented as the power of the power transmission device is transmitted to the auxiliary driving wheels as well as main driving wheels (not illustrated).

Next, an operation in the case of differential release of the present invention will be described.

As illustrated in FIGS. 1 to 3, in the state in which the first clutch part 131 engages with the third clutch part 123, the sleeve 150 further pushes the clutch ring 130 while performing the second moving operation by the second operation of the actuator device 200, such that the second clutch part 132 may engage with the fourth clutch part 141a. Therefore, the differential may be restricted.

For example, in case that one driving wheel of a vehicle is placed on a rough road, such as a bog, in a differential driving state, rotational resistances applied to the left and right driving wheels become different. For this reason, a relative difference in speeds between one side gear 141 and the other side gear 142 occurs, and the driving wheel placed in the rough road idles, which makes it impossible for the driving wheel to escape from the rough road.

However, in a differential restriction state in which the second clutch part 132 engages with the fourth clutch part 141a, one side gear 141 and the other side gear 142 rotate at the same speed, such that one driving wheel may escape from a rough road even though the driving wheel is placed in the rough road such as a bog.

Next, an operation in the case of two-wheel drive of the present invention will be described.

As illustrated in FIGS. 1 to 3, when the ball screw shaft 230 is rotated by the operation of the motor 220 of the actuator device 200, the transfer nut 250 may move in a release direction of the clutch ring 130.

When the transfer nut 250 moves in the release direction of the clutch ring 130, the fork 270 integrated with the transfer nut 250 may move the sleeve 150.

For example, in the case of the four-wheel drive state, the sleeve 150 pulls the clutch ring 130 in the release direction while being moved in the release direction by the operation of the actuator device 200, such that the first clutch part 131 and the third clutch part 123 may disengage. Therefore, the two-wheel drive (2WD) may be implemented.

For example, in the differential restriction state, the sleeve 150 pulls the clutch ring 130 in the release direction while being moved in the release direction by the operation of the actuator device 200, such that the second clutch part 132 and the fourth clutch part 141a may disengage first, and then the first clutch part 131 and the third clutch part 123 may disengage. Therefore, the two-wheel drive (2WD) may be implemented.

In the engagement release state, the power of the power generation device (not illustrated), such as the engine or the drive motor, is blocked, such that the power of the power generation device is not transmitted to the power transmission member 190.

The two opposite auxiliary driving wheels (not illustrated) may coast, and the rotational forces of the two opposite auxiliary driving wheels are transmitted to one side gear 141 and the other side gear 142, such that one side gear 141 and the other side gear 142 may rotate.

Because one side gear 141 and the other side gear 142 rotate in the state in which one side gear 141 and the other side gear 142 engage with the pinion gear 143, the support ring 120 may also rotate together with one side gear 141 and the other side gear 142.

In this case, the support ring 120 may freely rotate in the casing 110 in the state in which the support ring 120 is separated from the casing 110 uncoupled from the clutch ring 130 fixed to the casing 110.

In the state in which the support ring 120 and the casing 110 are separated, only the support ring 120 rotates, and the casing 110 does not rotate. Therefore, the two-wheel drive in which only the main driving wheels drive the vehicle and the auxiliary driving wheels coast may be implemented.

For example, because the electric vehicle travels at a high rotational speed, high differential noise may certainly occur. However, the present invention may solve the problem of the occurrence of high differential noise in the related art because the support ring 120 rotates in the casing 110.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A disconnector apparatus comprising:
   a casing having therein a support ring and one side gear, the one side gear being configured to engage with a pinion gear disposed in the support ring; and
   a clutch ring connected to an actuator device by a sleeve and movable by an operation of the actuator device, the clutch ring comprising a first clutch disposed on an inner-diameter portion of the clutch ring at one side of the clutch ring facing the one side gear, and a second clutch disposed on one inner surface of the inner-diameter portion,
   wherein the first clutch is configured to engage with a third clutch disposed on an outer-diameter portion of the support ring at one side of the support ring by a first moving operation of the clutch ring by a first operation of the actuator device, and
   wherein the second clutch is configured to engage with a fourth clutch disposed on one surface of the one side gear by a second moving operation of the clutch ring by a second operation of the actuator device,
   wherein the clutch ring has a plurality of leg parts, the plurality of leg parts extending toward the sleeve from another side of the clutch ring, and an end of each of the plurality of leg parts is disposed outside of the casing through a corresponding through-hole of the casing and connected to the sleeve, and
   wherein a contact surface of each of the plurality of leg parts in contact with the corresponding through-hole has an inversely tapered structure, wherein a width of the contact surface decreases in a direction from the end of each of the plurality of leg parts toward the corresponding through-hole.

2. The disconnector apparatus of claim 1, wherein each of the first clutch and the third clutch is a spline clutch.

3. The disconnector apparatus of claim 1, wherein each of the second clutch and the fourth clutch is a dog clutch.

4. The disconnector apparatus of claim 1, wherein the sleeve is connected to a fork, and the fork is disposed on a transfer nut of the actuator device.

5. The disconnector apparatus of claim 4, wherein the actuator device comprises:
   a housing;
   a motor coupled to the housing; and a ball screw shaft connected to the motor, wherein the transfer nut is coupled to the ball screw shaft and movable along the ball screw shaft while being guided by a guide rail disposed in the housing, and wherein the fork extends in a direction from the transfer nut toward the sleeve through an opening portion of the housing and is connected to the sleeve.

6. The disconnector apparatus of claim 5, wherein one side of the guide rail is elastically supported by a return spring, one side of the return spring is disposed in an accommodation hole of the housing, and another side of the return spring is configured to be caught by a catching projection disposed at the one side of the guide rail.

7. The disconnector apparatus of claim 1, wherein during the first operation of the actuator device, the sleeve is configured to push the clutch ring to allow the first clutch to engage with the third clutch to implement four-wheel drive, and wherein during the second operation of the actuator device, the sleeve is configured to further push the clutch ring to allow the second clutch to engage with the fourth clutch to restrict a differential.

8. The disconnector apparatus of claim 1, wherein the pinion gear is configured to engage with another side gear disposed opposite to the one side gear.

9. The disconnector apparatus of claim 8, wherein a coupling pin is coupled to the outer-diameter portion of the support ring and penetrates a center of the pinion gear.

10. The disconnector apparatus of claim 9, wherein a fixing pin is coupled to another side of the support ring and penetrates the coupling pin.

* * * * *